United States Patent Office 2,845,412
Patented July 29, 1958

2,845,412
RECOVERY PROCESS FOR POLYETHYLENE

George Hommel Heyson, Wilmington, Del., assignor to E. I. du Pont de Nemours and Company, Wilmington, Del., a corporation of Delaware No Drawing. Application May 3, 1955
Serial No. 505,845

7 Claims. (Cl. 260—94.9)

This invention relates to an improved method for separating polyethylene from the mixtures produced by polymerization of ethylene in the presence of catalysts containing inorganic components, especially those catalysts which are formed by admixing a salt or alcoholate of a transition element, such as titanium, with a reducing component, such as an active metal, or a compound having a hydrocarbon group attached directly to an aluminum atom.

Heretofore, it has been known that polyethylene which is produced in the presence of certain catalysts, for example, those formed from $TiCl_4+LiAl(Alkyl)_4$ or polyvalent metals in combination with metal alkyls, is relatively free from branching, and as a result has unique properties, which quite markedly distinguish it from typical commercial polythenes having a $C/CH_3$ ratio of about 20/1 to 30/1. W. M. D. Bryant, "Journal of Polymer Science," 2, 550–551, 1947, and other authors in a series of articles in "Journal of the American Chemical Society," 75, 6110, 6113, 6118, 6123 and 6127, 1953, have described polyethylenes of various degrees of branching, including those in which the $C/CH_3$ ratio was as low as 100/0.3 and 100/0.19, respectively.

Recently, widespread interest has been created in the highly linear polyethylenes by a series of announcements in the United States and abroad relating to production of this material on a large scale. ("Angewandte Chemie," February 1955, 41; "Chemical and Engineering News," March 21, 1955).

In general, the most economical methods for making the highly linear polymer have involved the use of catalysts containing inorganic components, which give rise to undesirable impurities in the polymers unless special precautions are taken.

In connection with the important developments hereinabove outlined, a need has, therefore, arisen for improved methods for separating linear polyethylene from the crude polymerization products. More particularly, a need has developed for polyethylene which is pure white or colorless, and does not become darkened in later processing. While the polymers formed heretofore have been in many instances pure white, they nevertheless, in many instances, have become darkened somewhat during molding or extrusion at elevated temperatures.

While alcoholysis (particularly with isopropanol) is highly effective for producing virtually ash-free polymer, still further improvement is desirable in producing polymer which is free of traces of undesirable components which produce deviations from pure whiteness during later processing in steel equipment at elevated temperatures.

It has been discovered in accordance with this invention that traces of components which produce undesirable darkening, as above described, can be eliminated from the polymer by including a small quantity of an alkali metal alcoholate, especially a lithium alkanolate, in the catalyst deactivation mixture.

In a preferred embodiment this treatment of the polymeric product, according to the present invention, is carried out in a manner which eliminates any need for a separate step for extracting "grease" (low molecular weight polymeric product, soluble in boiling benzene) from the mixture. This is accomplished in a preferred embodiment of the present invention by extraction of the polymer in a molten form at 125° to 225° C. (preferably 175° to 225° C.). Elimination of the "grease" in this manner removes a source of thermal instability. The elimination of the "grease" improves the tear-strength of the polymer and increases the stiffness while raising the polymer density. Another advantage, which in certain instances is related to the color stabilization mentioned hereinabove, is the elimination of sources of acid such as MCl which can give rise to corrosion as well as to darkening during subsequent treatment in steel equipment.

This invention can be better understood by considering the fact that titanium and aluminum halides, and other such salts, react with alcohol-metal alcoholate mixtures to form the corresponding alcoholates. In the presence of alkali metal alcoholates, this formation of Al or Ti alcoholates is accelerated. The solubilization of the inorganic impurities is frequently due, at least in part, to these reactions.

To effect the conversion of inorganic catalyst components to alcoholate, however, it is important to have the polymer in a form which can be acted upon readily by the reactant alcoholate. For example, temperature should preferably be higher than the polymerization temperature, and, in fact, higher than the crystalline melting point of the polymer. Also, optimum results are obtained when the polymer is initially dissolved in a solvent which facilitates contact of polymer molecules (and inorganic components) with the reactant alcoholate. Since polyethylene is not soluble at low temperatures, it is essential to carry out the reaction of alcoholate at temperatures above the crystalline melting point of the polymer. For similar reasons, it is preferred to employ lithium alcoholate as the reactant rather than alcoholates which are less soluble in organic media.

The invention is especially well adapted to operation in a continuous manner. This can best be accomplished by continuously injecting an alcohol such as methanol, ethanol, or n-butanol and an alcoholate, as hereinbelow defined, into a polymerization reactor discharge line (containing an ethylene polymerization mixture comprising linear polyethylene, a normally liquid inert hydrocarbon, and catalyst components comprising a compound of a transition element such as Ti, V, Mo, Zr, etc., and suitably also an active metal or an aluminum-hydrocarbon compound, or the like), whereby one or more of the inorganic components of the catalyst is converted to alcoholate, and any acid such as HCl is consumed. The quantity of alcohol injected at this stage is preferably less than is required for precipitation of any polyethylene. The resulting mixture is continuously passed to a second agitated vessel equipped with baffles designed to minimize end-to-end mixing, and is maintained at a temperature above the crystalline melting point of the polymer at a pressure sufficient to maintain the contents of the vessel in the liquid phase. If desired, the latter vessel may be fed near the top, while a continuous or intermittent draw-off is taken from the bottom. In one of the embodiments of the invention, according to the latter type of operation, the upper three-quarters of the vessel are used to assure completion of the catalyst deactivation reaction while the polymer is still in solution. A stream of alcohol (e. g., methanol, ethanol, isopropanol) or ketone (e. g., acetone, methyl ethyl ketone) is injected into the lower part of the catalyst deactivation vessel in quantity sufficient to bring the concentration of alcohol or ketone in this vessel to 30–50% by weight, and thereby cause the separation of a polymer-rich (molten polymer) phase while leaving low molecular weight "grease" and at least a portion of the deactivated catalyst residues in the lighter (lower density) phase. The effluent from the catalyst deactivation-precipitation vessel is passed into a separator. The molten polymer phase, having a decreased content of "grease" and containing little or no catalyst residue, is withdrawn from the bottom of the separator, and the lighter (lower density) phase containing "grease" and (in most instances) dissolved catalyst residues is removed from the top. The said polymer-rich phase is freed of solvent by evaporation thereof. The organic liquids are all recovered by known distillation techniques. The polymer thus obtained is of exceptionally high quality from the standpoint of whiteness, low ash, thermal stability, and freedom from "grease."

It is not essential that the alcoholate produced from the catalyst residue be soluble, but this is generally desirable if an ash-free product is desired. Since the methylates are generally less soluble than the higher alkanolates, methanol is not always effective in producing ash-free product, unless a subsequent extraction with isopropanol or other higher alcohol at elevated temperatures is also employed.

The invention is illustrated further by the following examples. In each instance the polymerization mixture employed was the effluent produced in a continuous polymerizer for converting ethylene to linear polymer under the following conditions:

Into a stainless steel autoclave, having a capacity of two liters and equipped with an efficient flat blade stirrer, is injected a solution of LiAl(decyl)$_4$ in cyclohexane (concentration 1.7 millimoles per pound of cyclohexane). Also injected is a second stream composed of (1) ethylene, and (2) a solution of TiCl$_4$ in cyclohexane (concentration 3.0 millimoles per pound). These streams enter the autoclave at the top, and the mixture is conducted through the autoclave at a pressure which is substantially equal to that used in the degreasing step described in the examples which follow, namely, 1000–2000 pounds per square inch. The weight ratios of the respective streams is controlled so as to maintain the LiAl(decyl)$_4$:TiCl$_4$ mole ratio within the range of 0.94:1 to 1.3:1. The concentration of TiCl$_4$ in terms of millimoles per pound of total feed is held within the range of 0.65 to 1.41. Temperature is maintained at 200° to 227° C. The total feed rate is held at 25 to 30 pounds per hour, and of this the ethylene portion is from 3 to 6.5 pounds per hour. The percentage conversion of ethylene is from 25 to 85%. The effluent from this system, without lowering temperature, is conducted continuously into the apparatus employed in the examples which follow.

*Example I*

An ethylene polymerization mixture, obtained as above described, was pumped into a continuous reactor at the rate of 30.6 pounds per hour, along with 24.5 moles sodium methylate per mole of TiCl$_4$ initially present in the polymerization mixture, and a quantity of methanol sufficient to form Ti(OCH$_3$)$_4$ from the said TiCl$_4$. The polymerization mixture was heated to 217° C., with agitation, the pressure being 2000 pounds per square inch. Following this, the resulting liquid was passed continuously into a vessel adapted for completion of the catalyst deactivation reaction, followed by continuous injection of methanol. By injecting methanol at the rate of 21.8 pounds per hour, molten polyethylene was precipitated, the temperature after methanol injection being 188° C. The polymer was permitted to settle (in a continuous settler) and the settled material (49.7% solids) was withdrawn from the base of the settler, and was dried. The dried product was pure white and remained white when heated in contact with steel. It exhibited exceptionally high thermal stability. The melt index was 0.03; percent grease 0.00; ash 0.67%.

Similar results are obtained by use of acetone in place of methanol as the precipitating solvent.

*Example II*

An ethylene polymerization mixture prepared as above described was pumped into a continuous reactor at the rate of about 25.7 pounds per hour along with 19.4 moles lithium methylate per mole of TiCl$_4$ initially present in the polymerization mixture, and a quantity of methanol sufficient to form Ti(OCH$_3$)$_4$ from the said TiCl$_4$. The resulting mixture was heated to 217° C. with agitation, the pressure being 2000 pounds per square inch. Following this, the resulting substantially homogeneous liquid was passed continuously into a vessel adapted for continuous injection of methanol. By injecting methanol at the rate of 20.5 pounds per hour, molten polyethylene was precipitated, the temperature after methanol injection being 194° C. The polymer was permitted to settle (in a continuous settler); supernatant liquid was recovered and the settled material was withdrawn from the base of the settler and dried. The dried product was pure white and remained white when heated in contact with steel. It exhibited exceptionally high thermal stability. The melt index was 0.62; percent grease 1.19; percent ash 0.51.

*Example III*

An ethylene polymerization mixture prepared as above described was pumped into a continuous reactor at the rate of 25.9 pounds per hour along with 11.3 moles lithium n-butylate per mole TiCl$_4$ initially present in the polymerization mixture, and a quantity of n-butanol sufficient to form Ti(OC$_4$H$_9$)$_4$ from said TiCl$_4$. The resulting mixture was heated to 195° with agitation, the pressure being 1000 pounds per square inch. Following this, the resulting substantially homogeneous liquid was passed continuously into a vessel adapted for continuous injection of methanol. By injecting methanol at the rate of 19.8 pounds per hour, polyethylene was precipitated, the temperature after methanol injection being 187° C. The precipitate was permitted to settle (in a continuous settler), supernatant liquid was recovered and the settled material was withdrawn from the base of the settler and dried. The dried product was pure white and remained white when heated in contact with steel. It exhibited exceptionally high thermal stability. The melt index was 0.26; percent grease 0.63; percent ash 0.15.

It is to be understood that numerous variations of the foregoing examples are possible, without departing from the spirit and scope of the invention. The efficiency of the degreasing and de-ashing operations are to some extent dependent, not only on the alcohols selected, but also upon the efficiency of the extraction itself; thus various mechanical devices such as counter-current extractors and the like can be employed to produce the maximum mechanical efficiency desired. Generally also, the alcohols should be kept as free as possible from traces of moisture when the formation of hydrolysis products is to be avoided.

In preferred embodiments, the drying step is effected by simply letting down the pressure on the polymer; i. e., withdrawing it through a valve. The volatile material flashes off, while the polymer solidifies almost instantaneously.

If desired, the molten polymer phase can be directly withdrawn from the degreaser into the form of a sheet, which later can be subjected to dicing by means of a dicer such as that disclosed in the Anderson patent U. S. P. 2,655,213. One of the valuable features of the invention is the production of a molten polymeric product which can be converted to a molding powder or film directly, without expensive intermediate steps.

It is to be understood also that where darkening of the polymeric product is avoided, the complete absence of ash is not always a desirable objective. A few tenths of a percent of ash is sometimes no disadvantage at all. Where low ash is desired, methanol should not be employed as the alkanolating agent, unless special precautions are taken to remove the resulting alkanolate from the polymerization mixture.

The invention is useful for production of highly linear polyethylenes (those having, for example, not more than 0.3 methyl groups per 100 carbon atoms, or even less branching) and having a grease content of 0.00 to 4.0%, preferably 0.0 to 1.0%. The ash content of these products can also be patterned to the contemplated useful application and can be reduced to 0.0%, if desired, or at some slightly higher level within the range of 0.0% to 0.8%.

I claim:

1. The process which comprises the following sequence of steps: (1) introducing an alkali metal alcoholate and an alcohol into an ethylene polymerization mixture containing substantially linear normally solid polyethylene, an inert liquid hydrocarbon, and a compound of a transition element of the class consisting of Ti, V, Mo, and Zr, said compound having salt-forming groups attached to said element, the quantity of said alcohol and alcoholate being sufficient to convert the transition element to alcoholate and to react with the salt-forming groups present; (2) heating the resulting mixture at a temperature high enough to maintain the polyethylene in solution, said temperature being within the range of 175° to 225° C.; (3) precipitating the said polyethylene as a molten phase by injecting liquid of the class consisting of alkanols and alkanones at a temperature in the range of 125° to 225° C. and low enough to effect said precipitation, said liquid having not more than four carbon atoms per molecule, and (4) recovering the polyethylene from the resulting mixture, whereby contaminants which produce darkening of said polyethylene are removed.

2. Process of claim 1 wherein the transition element is titanium.

3. Process of claim 2 wherein the concentration of said liquid of the class consisting of alkanols and alkanones in step (3) is 30 to 50% by weight of the mixed solvents present.

4. Process of claim 3 wherein the inert liquid hydrocarbon is cyclohexane, and the liquid of the class consisting of alkanols and alkanones is methanol.

5. Process of claim 3 wherein the temperature in both step (2) and step (3) is within the range of 175° to 225° C., the temperature in step (3) being below the temperature in step (2).

6. The process which comprises introducing lithium methylate and methanol into an ethylene polymerization mixture containing linear normally solid polyethylene, an inert liquid hydrocarbon, and an ethylene polymerization catalyst mixture formed by admixing a titanium salt with a compound of aluminum having an aluminum atom attached directly to a hydrocarbon group, heating the resulting mixture at a temperature within the range of 175° to 225° C. until the titanium is converted to $Ti(OCH_3)_4$, raising the methanol content of the mixture to 30%–50% by addition of more methanol, heating the resulting mixture at a temperature of 175° to 200° C. whereby precipitation of substantially linear polyethylene having a grease content of 0.0 to 4.0%, and an ash content of 0.0 to 1.0% occurs, and thereby recovering said polyethylene from the resulting mixture.

7. In a process according to claim 1 for separating polyethylene from polymerization mixture containing same and an inert liquid hydrocarbon, the steps which comprise introducing into the mixture a liquid of the class consisting of alkanols and alkanones, in sufficient quantity to precipitate a liquid polymer-containing phase at a temperature of 125° to 225° C., and thereafter withdrawing the said polymer-containing phase from the resulting mixture.

References Cited in the file of this patent

UNITED STATES PATENTS

| | | |
|---|---|---|
| 2,101,558 | Nealson | Dec. 7, 1937 |
| 2,721,189 | Anderson et al. | Oct. 18, 1955 |

UNITED STATES PATENT OFFICE
CERTIFICATE OF CORRECTION

Patent No. 2,845,412                                    July 29, 1958

George Hommel Heyson

It is hereby certified that error appears in the printed specification of the above numbered patent requiring correction and that the said Letters Patent should read as corrected below.

Column 2, line 16, for "MCl" read -- HCl --.

Signed and sealed this 7th day of October 1958.

(SEAL)
Attest:

KARL H. AXLINE
Attesting Officer

ROBERT C. WATSON
Commissioner of Patents